United States Patent [19]

Pruim

[11] Patent Number: 4,881,388
[45] Date of Patent: Nov. 21, 1989

[54] LOCK FOR A BRAKE VALVE

[76] Inventor: Ronald Pruim, 29 Lynn Ridge Villas S.E., Calgary, Alberta, Canada, T2C 2N1

[21] Appl. No.: 264,138

[22] Filed: Oct. 28, 1988

[51] Int. Cl.$^4$ ............................................. F16K 35/00
[52] U.S. Cl. ........................................ 70/175; 70/177; 137/384.2
[58] Field of Search ................................... 70/175–179, 70/208, 224, 242, 244; 137/384.2, 384.6

[56] References Cited

U.S. PATENT DOCUMENTS

| | | | |
|---|---|---|---|
| 3,186,196 | 6/1965 | Moberg | 70/177 |
| 3,382,688 | 5/1968 | Wellekens | 70/208 |
| 4,450,697 | 5/1984 | Ellis | 70/178 |
| 4,476,699 | 10/1984 | Dahlborg | 70/178 X |
| 4,633,686 | 1/1987 | Carr | 70/179 |
| 4,779,433 | 10/1988 | Légaré | 70/177 X |

Primary Examiner—Gary L. Smith
Assistant Examiner—Douglas E. Ringel
Attorney, Agent, or Firm—George H. Dunsmuir

[57] ABSTRACT

A simple lock device for use on a valve of the push-pull or plunger operated type includes a tubular casing defined by a outer shell and an inner core, which is connected to the plunger of a valve so that the valve can be operated by pushing the casing against the valve plunger, a sleeve slidable into one end of the casing between the outer shell and the core, permitting plunger operation and actuation of the valve, and out of the casing against a fixed element such as the valve casing carrying the plunger, pins radially movable in the casing for engaging the sleeve to prevent movement thereof into the casing, and consequently to prevent actuation of the valve, and a lock in the other end of the casing for controlling movement of the pins, and thereby to control actuation of the valve.

13 Claims, 2 Drawing Sheets

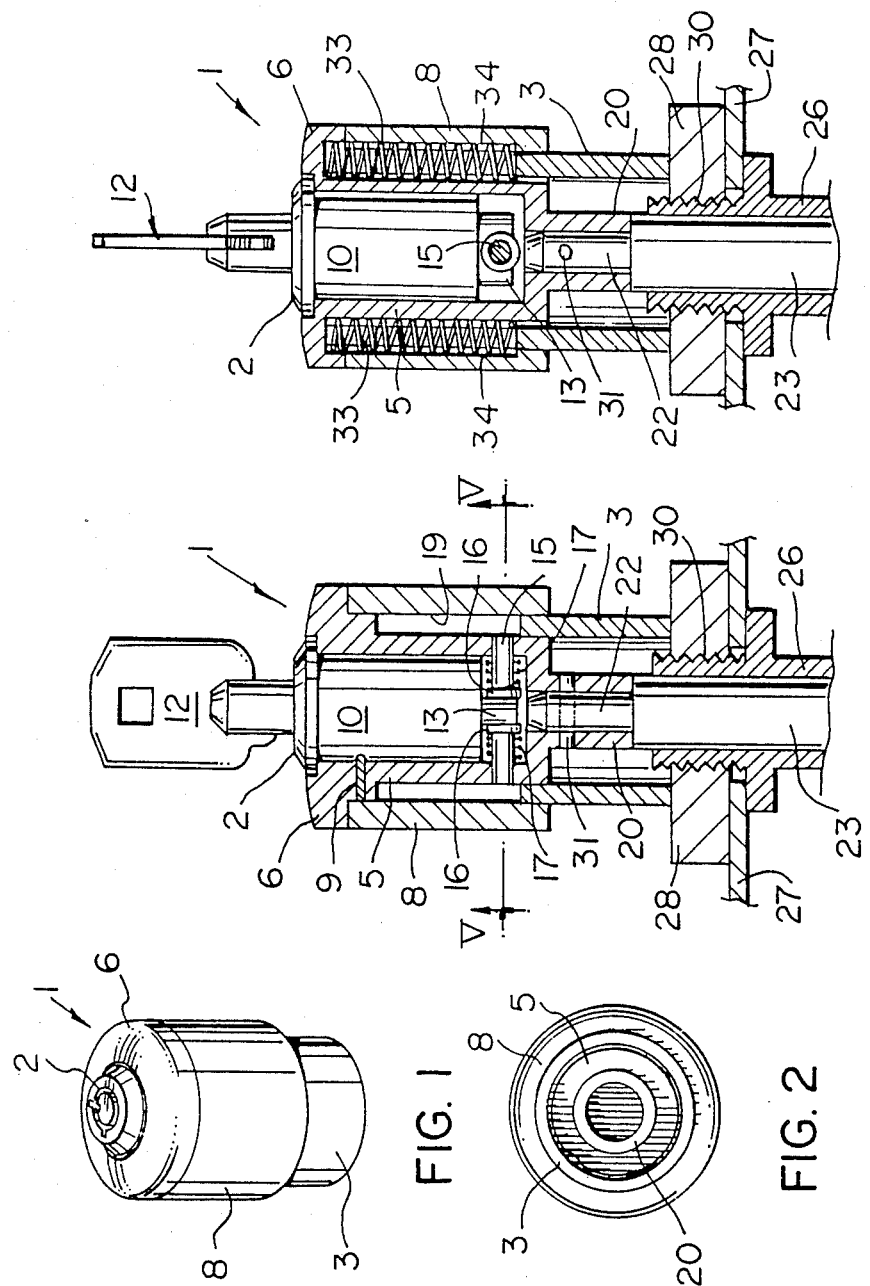

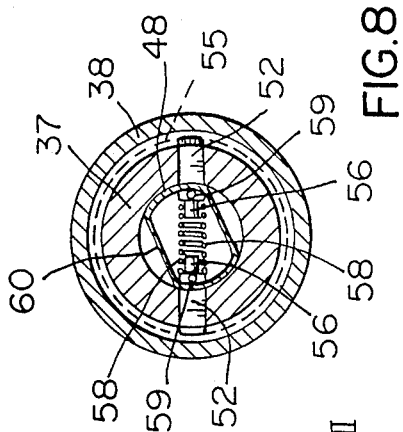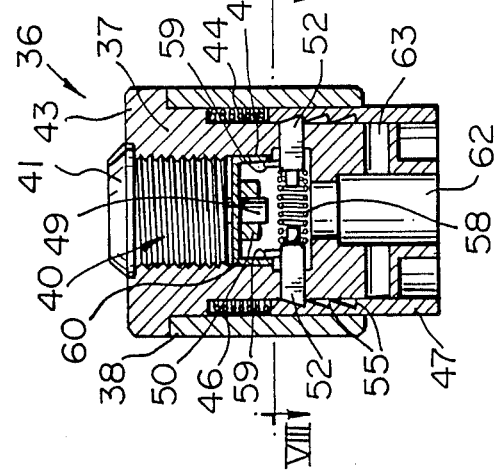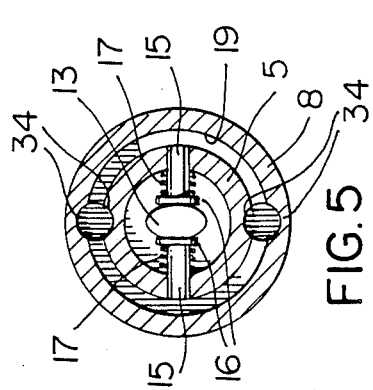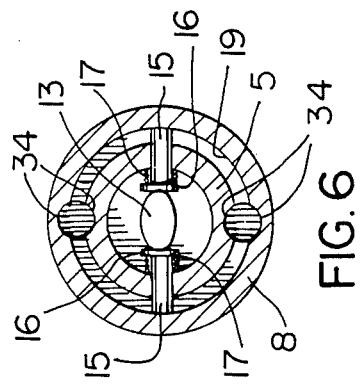

LOCK FOR A BRAKE VALVE

BACKGROUND OF THE INVENTION

This invention relates to a lock device for a plunger operated valve.

The device of the present invention was specifically designed for use on a truck or other automotive vehicle to prevent unlocking of the air brake. However, it will be appreciated that the device can be used with virtually any plunger operated valve of the push-pull type.

It is desirable to provide a lock device for valves used on tractor trailers, buses or trucks in order to prevent theft of the vehicle. If the air valve is locked, the vehicle's air brakes cannot be disengaged, and consequently theft of the vehicle is difficult or virtually impossible.

The object of the present invention is to provide a relatively simple lock device for a plunger operated valve of the push-pull type which can be installed in new or existing vehicles.

BRIEF SUMMARY OF THE INVENTION

Accordingly, the present invention relates to a lock device for a plunger operated valve comprising tubular casing means; coupler means on one end of said casing means for engaging the plunger of a valve so that the plunger can be operated by movement of said casing means only; sleeve means slidable in said one end of said casing means for movement into said casing means permitting plunger operation and actuation of the valve, and out of said casing means against a fixed element carrying said valve plunger; pin means radially slidable in said casing means for engaging said sleeve means to prevent movement thereof into said casing means, and consequently to prevent actuation of the valve; and lock means for controlling movement of said pin means, and thereby control actuation of said valve means.

BRIEF DESCRIPTION OF THE DRAWINGS

The invention will be described in greater detail with reference to the accompanying drawings, which illustrate preferred embodiments of the invention, and wherein:

FIG. 1 is a perspective view of a lock device in accordance with the present invention;

FIG. 2 is a bottom view of the lock device of FIG. 1;

FIG. 3 is a longitudinal sectional view of the lock device of FIGS. 1 and 2 mounted in a vehicle instrument panel;

FIG. 4 is a longitudinal sectional view of the lock device of FIGS. 1 to 3 taken in a plane perpendicular to the cross section of FIG. 3;

FIGS. 5 and 6 are cross sections taken generally along line V—V of FIG. 3, showing lock pins in two locations;

FIG. 7 is a longitudinal sectional view of a second embodiment of the lock device of the present invention;

FIG. 8 is a cross section taken generally along line VIII—VIII of FIG. 7; and

FIG. 9 is a perspective view of a lock pin used in the lock device of FIGS. 7 and 8.

DESCRIPTION OF THE PREFERRED EMBODIMENT(S)

With reference to the drawings, the lock device of the present invention includes a tubular casing generally indicated at 1 carrying a cylindrical lock 2 in one end thereof and a sleeve 3 in the other end thereof. The casing 1 is defined by a tubular core 5 with a circular top end 6 for receiving the lock 2, and an outer shell or sleeve 8. The lock 2 is off the shelf hardware—in this case a Chicago tubular lock—which is retained in the casing 1 by a pin 9. The core 5 is internally threaded (not shown) for receiving the externally threaded (not shown) cylindrical body 10 of the lock 2.

The lock 2 is operated by a key 12 inserted into the top end thereof. Rotation of the key 12 causes a corresponding rotation of a cam 13 extending out of the bottom end of the lock 2. As best shown in FIGS. 5 and 6, the cam 13 has an elliptical cross-sectional configuration for pushing a pair of radially extending lock pins 15 outwardly. Heads 16 are provided on the pins 15 for retaining helical springs 17, which bias the pins 15 inwardly. The pins 15 are slidably mounted in the core 5 for movement into and out of a cylindrical passage 19 between the core 5 and the sleeve 8.

A narrow diameter tubular extension 20 on the bottom end of the core 5 is used as a coupler for connecting the lock device to the top end 22 of the plunger 23 of an air valve (not shown). The air valve housing 26 (FIGS. 3 and 4) carrying the plunger 23 is mounted in a vehicle dashboard or instrument panel 27 using a nut 28 for engaging the externally threaded outer end 30 of the housing 26. The plunger 23 is retained in the extension 20 by a roll pin 31 (FIG. 3).

The plunger 23 is operated by pressing it into the housing 26. In order to lock the plunger 23 in the outer position, i.e. to prevent depression of the plunger to close the valve, the sleeve 3 is slidably mounted in the passage 19 between the core 5 and the outer casing shell 8. The sleeve 3 is biased downwardly to the extended, locking position by a pair of helical springs 33 (FIG. 4), which are mounted in opposed grooves 34 in the core 5 and the shell 8 defining enlarged portions of the passage 19. The springs 33 extend upwardly into the top end of the casing 1 on opposite sides of the casing. A plane through the springs 33 is perpendicular to the plane of the pins 15.

When the pins 15 are retracted (FIGS. 3 and 5), the sleeve 3 is free to move in the passage 19, and the plunger 23 can be depressed to close the valve. When the key 12 is turned to rotate the cam 13 through 90° (FIG. 6), the pins 15 are pushed radially outwardly into the passage 19, i.e. into the path of the sleeve 3. Thus, the sleeve 3 cannot move into the passage 19, and the plunger 23 cannot be depressed.

Referring to FIGS. 7 to 9, in the second embodiment of the lock device of the invention a casing generally indicated at 36 is defined by a core 37 and an outer shell 38. The core 37 is internally threaded for receiving the externally threaded, cylindrical body 40 of a lock 41. The end 43 of the core 37 overlaps the outer shell 38, and together the core 37 and the shell 38 define a cylindrical passage 44 for receiving a single, large diameter, helical spring 46 and the top end of a sleeve 47.

An inverted cup like cam 48 is connected to the shaft 49 of the lock 40 by a nut 50 for controlling radial movement of a pair of locking pins 52 (FIG. 9). Each pin 52 includes a trapezoidal body 53 of square cross section, which is slidably mounted in the core 37 for radial movement into engagement with one of a plurality of detents defined by parallel, annular sawtooth configuration of the grooves 55 permitting downward movement of the sleeve 47 when the pins 52 are extended, but preventing upward movement of the sleeve. The cylindrical inner ends 56 of the pins 52 are axially aligned, and extend into a helical spring 58, which biases the pins 52 outwardly. A lug 59 extends upwardly from the inner end of the body 53 of each pin 52 for actuation by the cam 48, i.e. the lug 59 engages and slides along the inner surface of the side wall 60 (FIGS. 7 and 8) of the cam 48. The side wall 60 is generally rectangular with convex ends which are parallel to the interior of the core 37.

A longitudinally extending central passage 62 in the bottom of the core 37 receives the valve plunger (not shown), and a diametrically extending passage 63 intersects such passage 62 for receiving a pin (not shown) to lock the plunger in the core 37.

Thus, during operation, with the lock 41 open, the lugs 59 of the pins 52 are retained by the straight sides of the cam side wall 60, i.e. the pins 52 are in the retracted positions. In such positions, the sleeve 47 is free to slide in the passage 44 for opening and closing the valve. When the key (not shown) is turned in the lock 41 through 90°, the lugs 59 slide into position against the convex ends of the cam side wall 60. The spring 58 pushes the pins 52 outwardly into engagement with one of the annual grooves 55 in the sleeve 47 to lock the latter in one position. Thus, downward movement of the casing 36, and consequently closing of the valve are prevented.

While the device has been described for mounting on a vehicle instrument panel, it will be appreciated that the lock device can be mounted on any fixed element or object, even the valve housing itself. It is merely necessary that the core of the device be attached to the valve plunger for movement therewith, and that the outer end of the sleeve, which is slidably mounted in the casing, engage an element which is fixed with respect to and surrounds the valve plunger.

What I claim is:

1. A lock device for a plunger operated valve comprising tubular casing means; coupler means on one end of said casing means for engaging the plunger of a valve so that the plunger can be operated by movement of said casing means only; sleeve means slidable in said one end of said casing means for movement into said casing means permitting plunger operation and actuation of the valve, and out of said casing means against a fixed element carrying said valve plunger; pin means radially slidable in said casing means for enaging said sleeve means to prevent movement thereof into said casing means, and consequently to prevent actuation of the valve; and lock means for controlling movement of said pin means, and thereby control actuation of said valve means.

2. A lock device according to claim 1, wherein said casign means includes inner core means, integral with said coupler means for connection to a valve plunger and for receiving said lock means; and outer shell means for defining a passage with said core means for slidably receiving said sleeve means.

3. A lock device according to claim 2, including first spring means in said passage biasing said sleeve means outwardly, whereby when the valve plunger is released the casing means tends to move away from the fixed element carrying the plunger.

4. A lock device according to claim 3, wherein said first spring means includes a pair of helical springs in opposite sides of said sleeve passage.

5. A lock device according to claim 4, wherein said pin means includes a pair of diametrically opposed pins slidable in said core means between said pair of springs for movement between an extended position in said passage and a retracted, rest position out of said passage.

6. A lock device according to claim 5, including second spring means in said core means for returning said pins to the retracted, rest position.

7. A lock device according to claim 3, wherein said first spring means includes a helical spring in said passage surrounding said core means.

8. A lock device according to claim 7 including detent means in said sleeve means for retaining said sleeve means in the extended position to prevent valve actuation.

9. A lock device according to claim 8, wherein said detent means includes annular grooves in the inner surface of said sleeve means for receiving the outer ends of said pin means.

10. A lock device according to claim 1, including cam means on the inner end of said lock means for controlling movement of said pin means.

11. A lock device according to claim 10, wherein said cam means comprises a shaft of elliptical cross section.

12. A lock device according to claim 10, wherein said cam means includes a generally cup-shaped cam; and substantially rectangular with convex ends side wall means on said cam for engaging said pin means and controlling movement thereof.

13. A lock device according to claim 12, wherein said pin means includes lug means extending into said cam, whereby rotation of said cam by said lock means causes rectilinear movement of said pin means into the path of travel of said sleeve means.

* * * * *